United States Patent [19]
Shedd

[11] Patent Number: 4,756,005
[45] Date of Patent: Jul. 5, 1988

[54] DIGITAL SIGNAL REGENERATOR ARRANGED FOR FAULT LOCATION

[75] Inventor: Dennis A. Shedd, Lexington, Mass.

[73] Assignee: American Telephone and Telegraph Company AT&T Bell Laboratories, Murray Hill, N.J.

[21] Appl. No.: 866,902

[22] Filed: May 27, 1986

[51] Int. Cl.$^4$ .............................................. H04B 3/46
[52] U.S. Cl. ..................................... 375/3.1; 371/22; 375/4
[58] Field of Search ..................... 375/3.1, 4; 370/13, 370/13.1; 371/15, 22, 25, 27, 69; 379/1, 2, 4, 26; 328/164; 178/69 R, 69 G, 71 T

[56] References Cited

U.S. PATENT DOCUMENTS

| | | | |
|---|---|---|---|
| 3,987,395 | 10/1976 | Desombre et al. | 375/4 |
| 4,022,988 | 5/1977 | Lentz et al. | 375/3.1 |
| 4,077,004 | 2/1978 | Higo | 375/4 |
| 4,257,033 | 3/1981 | Ota et al. | 340/870.16 |
| 4,270,029 | 5/1981 | Sato et al. | 375/4 |
| 4,278,850 | 7/1981 | Sato et al. | 455/601 |
| 4,301,538 | 11/1981 | Desombre et al. | 375/4 |
| 4,317,010 | 2/1982 | Fillot | 370/13.1 |
| 4,319,080 | 3/1982 | Kuwahara | 375/3.1 |
| 4,604,745 | 8/1986 | Takasaki et al. | 379/4 |

OTHER PUBLICATIONS

"A 1 Gbit/s Wescott Data Test Set", *ESSCIRC 1979*, C. T. Mallett et al., Sep. 1979, pp. 14–16.

"GaAs Integrated Circuits for Error-Rate Measurement in High-Speed Digital Transmission Systems", *IEEE Jrnl. Solid-State Circuits*, C. A. Liechti et al., Aug. 1983, pp. 402–408.

*Primary Examiner*—Benedict V. Safourek
*Attorney, Agent, or Firm*—Richard B. Havill

[57] ABSTRACT

A digital signal regenerator, arranged for fault locating, receives a sequence of four-level signals representing first and second sequences of binary signals. When fault locating, the second sequence of binary signals is the same as the first sequence of binary signals but is delayed by n time slots. The received sequence of four-level signals is decoded into the first and second sequences of binary signals. Once decoded, the first sequence of binary signals is delayed by n time slots into a delayed first sequence of binary signals. The delayed first sequence of binary signals and the second sequence of binary signals are compared with each other. The comparator produces an error signal only when concurrent bits of the delayed first sequence of binary signals and of the second sequence of binary signals are different from one another.

6 Claims, 2 Drawing Sheets

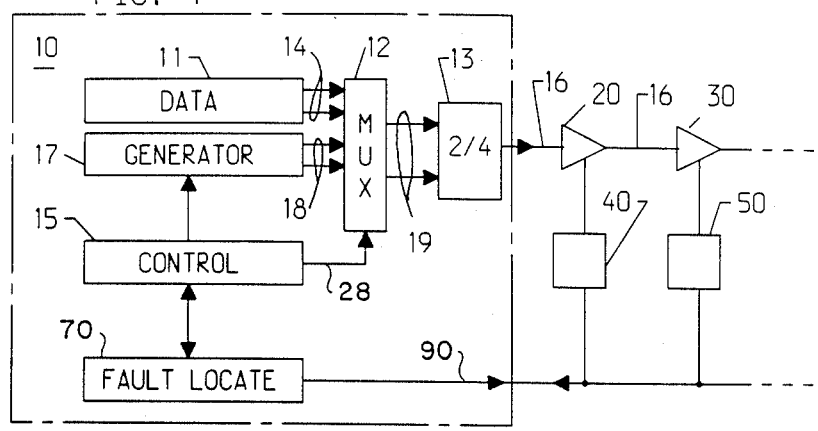
FIG. 1
FIG. 2
TABLE A
| IN$_1$ | IN$_2$ | OUTPUT LEVEL |
|---|---|---|
| 0 | 0 | +3 |
| 0 | 1 | +1 |
| 1 | 1 | −1 |
| 1 | 0 | −3 |
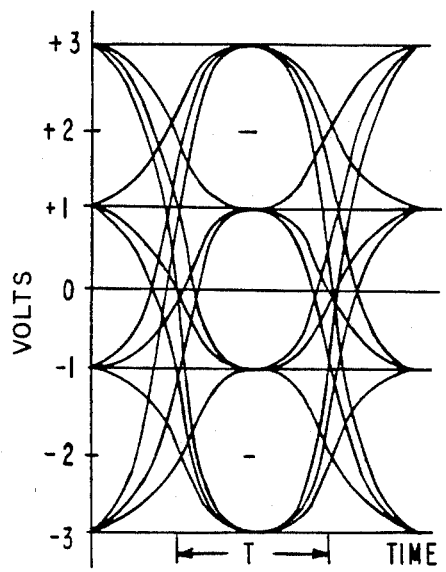
FIG. 3

DIGITAL SIGNAL REGENERATOR ARRANGED FOR FAULT LOCATION

BACKGROUND OF THE INVENTION

This invention relates to a digital transmission line regenerator which may be more particularly described as a regenerator arranged for fault location.

Error rate measurements are made on digital transmission lines to provide information indicating the quality of transmission, such as excellent, good, fair, poor and failed. Error rate can be determined by checking parity on an in-service basis or by an out-of-service test using a pseudorandom code sequence. Error rate measurements are made on an end-to-end basis because the in-service test requires recovery of framing at the location where the measurement is being made and because the out-of-service test requires external test sets. Recovery of framing is prohibitively expensive at each regenerator along the transmission line.

Separate fault location circuits and equipment are being provided for locating suspected or known faults along a transmission line. Typically an individually assigned supervisory frequency is uniquely associated with each repeater location for the purpose of polling the repeaters for fault location testing. By polling the repeaters with the uniquely assigned frequencies, it is possible to determine where a failure is located.

There are problems resulting from these testing arrangements. When the repeaters with the separate circuits are polled, it is possible to locate a complete failure in the system, but the location of a soft failure producing degraded operation is very difficult to determine. With the known error rate monitoring arrangements, which test from end-to-end, it is possible to readily determine that a soft failure is affecting system operation, but those known arrangements cannot readily determine where the soft failure is located.

It is desirable to develop an error rate measurement system which operates on a section-by-section basis for determining the location of any failure. A pseudorandom code sequence can be used for initiating remote error rate testing on regenerators along a digital transmission line. To use such a pseudorandom code sequence for conventional testing raises problems because the detector that would be required at every repeater location is complex and because errors appear to multiply as they progress through such detectors.

SUMMARY OF THE INVENTION

These problems are solved by a digital signal regenerator arranged for receiving a sequence of four-level signals representing two pseudorandom sequences of binary signals in which the second sequence of binary signals is the same as the first sequence of binary signals but is delayed by n time slots. The received sequence of four-level signals is decoded into the first and second sequences of binary signals. Once decoded, the first sequence of binary signals is delayed by n time slots into a delayed first sequence of binary signals. The delayed first sequence of binary signals and the second sequence of binary signals are compared with each other. The comparator produces an error signal only when concurrent bits of the delayed first sequence of binary signals and the second sequence of binary signals are different from one another.

BRIEF DESCRIPTION OF THE DRAWINGS

The invention may be better understood by reading the following detailed description when that description is read with reference to the attached drawings wherein FIG. 1 is a block diagram of part of a digital transmission system;

FIG. 2 is a truth table for a 2-level to 4-level converter;

FIG. 3 is an eye diagram of a 4-level signal; and

DETAILED DESCRIPTION

Figure 4:
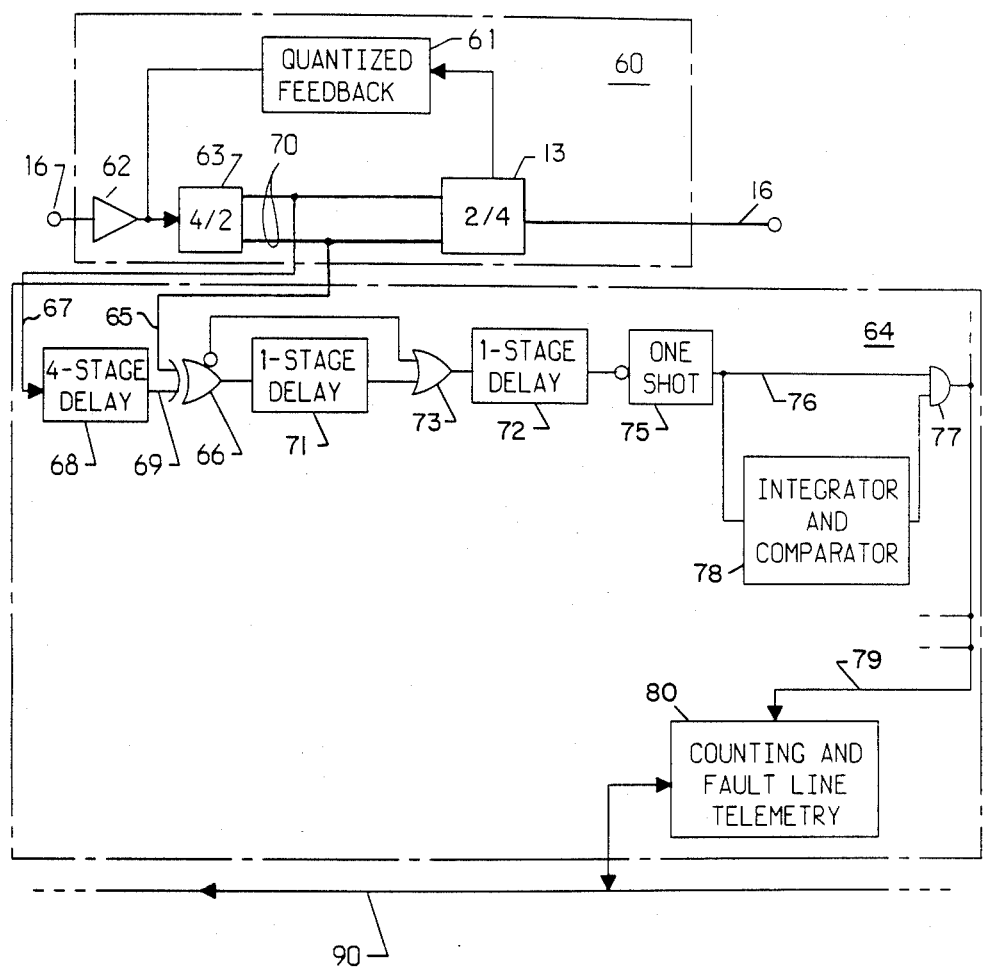
FIG. 4 is a block diagram of a regenerator and other interconnected circuitry arranged for fault locating by error detection testing.

Referring now to FIG. 1, there is shown a part of a digital transmission system. The part shown includes data transmitting and fault locating equipment 10 of the west terminal together with a transmission line 16 including two eastbound regenerators 20 and 30 and associated repeater fault location circuits 40 and 50.

In the data transmitting and fault locating equipment 10, there is a source of data 11 which includes a pair of digital transmission lines 14, such as T1 carrier lines, that operate concurrently at a common bit rate. During regular operation, the sequences of binary signals from the two digital transmission lines 14 are applied to and are forwarded through a multiplexer 12 to a converter 13. The two sequences of data from the pair of digital transmission lines 14 are merged together by the code converter 13. When merged by the code converter 13, the resulting single sequence of data is a four-level, or quaternary, signal which is transmitted along the transmission line 16 to the first regenerator 20. After being detected and regenerated by the regenerator 20, the four-level signal is transmitted further along the transmission line 16 and through the regenerator 30 to additional regenerators and an east terminal, which are not shown. Only the west-to-east direction of transmission is shown, however, in a typical system there also is equipment for the east-to-west direction of transmission.

When a malfunction arises, fault locating circuitry is activated under control of a circuit 15. The fault locating circuitry includes a code sequence generator 17 which produces a pair of pseudorandom sequences of binary signals which are applied by way of leads 18 to the multiplexer 12. Either a sequence with periodic violations or a sequence without periodic violations can be generated. In the fault locating mode, the control circuit 15 selects which of these sequences is generated by the generator 17 and applies a control signal to the multiplexer 12 causing the multiplexer to disable transmission of the pair of sequences of binary signals from the digital transmission lines 14 and to enable transmission of the pair of sequences of binary signals from the code sequence generator 17 to the code converter 13.

Whichever pair of sequences of binary signals is selected by the multiplexer 12 that pair is transmitted through a pair of leads 19 to the input of the converter 13. The two-level to four-level converter 13 converts the two sequences of binary signals into a four-level, or quaternary, signal for transmission to and through the regenerators 20 and 30 to the east terminal. The arrangement and operation of the circuit 13 is presented in greater detail in U.S. Pat. No. 4,606,046, issued in the name of J. J. Ludwick.

Referring now to FIG. 2, there is shown a TABLE A which is a truth table for converting from two binary sequences to a single four-level signal. The four levels are selected to be +3, +1, −1 and −3. These four levels provide equal separation between adjacent levels for facilitating detection of the various levels. Each row in TABLE A represents the conversion of one possible pair of input bits into a corresponding output level. Input bits are in the columns headed $IN_1$ and $IN_2$. The top row shows that an input pair of binary zeros is converted to the output level +3. The four-level output signals are transmitted by way of the transmission line 16 to the regenerator 20.

Referring now to FIG. 3, there is shown an eye diagram of the four-level signal as it is produced at the output of an equalizer within the regenerator 20 in FIG. 1.

In FIG. 4, there is shown a four-level regenerator 60 arranged for fault location. The regenerator 60 may be used in the system of FIG. 1 for either regenerator 20 or 30. In the regenerator 60 of FIG. 4, an equalizer 62 receives the four-level signal from a section of the transmission line 16. As previously mentioned, the received signal is equalized to produce the four-level signal, represented by the eye diagram of FIG. 3. After being equalized, the information in the received signal is detected and converted to two sequences of binary signals by a four-level to two-level converter 63. For optimum detection of the four different levels, the received signal is decoded in the regenerator 60 with reference to zero, +2 and −2 volts.

The four-level to two-level converter 63 is described in greater detail in a copending patent application, Serial No. 867,218 filed concurrently herewith in the names of Graczyk, Ludwick and Parsons (Case 1-2-1). This converter 63 is designed to convert from the four-level signal to a pair of two-level signals, to amplify the resulting pairs of two-level signals, and to retime them.

The output of the four-level to two-level converter 63 is two sequences of binary signals. Both of the sequences of binary signals are applied to the inputs of another two-level to four-level converter 13. This two-level to four-level converter 13 merges the two sequences of binary signals into a four-level signal. As previously mentioned, a more complete description of the two-level to four-level converter 13 is presented in U.S. Pat. No. 4,606,046 issued in the name of J. J. Ludwick. Coding of the signals is in accordance with the truth table shown in FIG. 2. A quantized feedback arrangement 61 applies the output of the two-level to four-level converter 13 back to the input of the four-level to two-level converter 63. Thus the regenerator 60 receives and regenerates the received four-level signal by converting the received four-level signal down to two sequences of binary signals and subsequently converting the two sequences of binary signals back to a regenerated four-level signal.

It should be recalled that at all times the two transmission lines 14 in FIG. 1 are applying two sequences of binary signals to the multiplexer 12. Simultaneously the test generator 17 also applies two sequences of binary signals to the multiplexer 12. A control signal on a lead 28 from the control circuit 15 determines whether the two sequences of binary signals from the transmission lines 14 or the pair of binary code sequences from the test generator 17 are applied to the input of the two-level to four-level converter 13 for transmission to the line of repeaters.

Regardless of the input selected for the two-level to four-level converter, it merges the two received sequences and produces a single four-level signal which is transmitted along the transmission line 16. Whichever pair of sequences of binary signals is represented by the four-level signal, that pair of sequences of binary signals is reproduced at the output of the four-level to two-level converter 63 in the regenerator 60 of FIG. 4. Thus when the four-level signal being transmitted on the line 16 represents the test generator signals, the test sequences of binary signals are reproduced on leads 70 by the four-level to two-level converter 63.

Advantageously the code sequence generator 17 produces two pseudorandom sequences of binary signals. The first and second pseudorandom sequences of binary signals are identical to one another except that the second sequence is delayed behind the first sequence by n clock cycles. In the exemplary arrangement n=4.

Both of these sequences of binary signals are tapped off and are used in the fault location circuit 64, which may be used as either of the circuits 40 or 50 of FIG. 1. The second, or delayed, pseudorandom sequence of binary signals is applied in the circuit 64 directly by way of a lead 65 to an input of a comparator 66, which is shown illustratively as an EXCL OR gate. The first, or undelayed, sequence of binary signals is applied in the circuit 64 by way of a lead 67 to a delay circuit 68 which delays the first sequence by n time slots. In FIG. 4 the delay is shown illustratively as n=4 time slots. The delayed first pseudorandom sequence of binary signals is applied by way of a lead 69 to another input of the comparator 66. Since the first and second pseudorandom sequences of binary signals are alike except for periodic violations that may have been inserted by the generator 17 and since they both have been delayed by n time slots (one is delayed before transmission and one is delayed after conversion in the regenerator), concurrent pulses of the two sequences should be alike unless there is an error or a periodic violation in one of them. An error of course is caused by a malfunction of some cirucit or because of some trouble in the transmission line 16. A periodic violation, however, is a pulse purposely changed periodically in one sequence but not in the other sequence before transmission. The comparator 66 produces a zero logic level output when the concurrent input pulses are alike, such as when there are no errors, and a one logic level output when concurrent input pulses are different from one another, such as when there is an error or a periodic violation. During a fault locating procedure, a one logic level from the comparator 66 indicates that an error or a periodic violation has occurred. Thus for the fault locating procedure, the comparator 66 produces an error indication only when an error or a periodic violation occurs. Isolated errors cause a one logic level from the comparator 66. An error burst also will cause a one logic level from the comparator 66 but will not necessarily produce a separate pulse for each error of the burst.

The repeater fault location circuit 64 provides memory functions and some logic for integrating error signals with one another and for screening out signals produced by the comparator 66 when regular data signals are being processed by the regenerator.

If the tip and ring leads are reversed along the transmission line 16 and before the regenerator 60, the signal on one of the leads 70 also will be inverted creating a tip-ring reversal problem. As a result of such a signal inversion, the comparator 66 produces an inverted output signal. This means that during a fault location test procedure, error signals are a zero logic level rather than the one logic level.

To solve this tip-ring reversal problem, a pair of flip-flop circuits 71 and 72 and an OR gate 73 are inserted in the fault location circuit 64. As a result of the operation of the flip-flops 71 and 72 and OR gate 73 and regardless of whether or not there is a tip-ring reversal, the input to a one-shot circuit 74 normally is a low logic level during any fault location test procedure. The occurrence of any errors or periodic violations causes the flip-flop 72 to produce a one logic level pulse for triggering the one-shot circuit 75. Duration of the pulse from the one-shot circuit is sufficiently long that the error pulses or periodic violations are stretched out into stretched error pulses thereby reducing the frequency of error signals. This reduced frequency of the stretched error pulses provides an indication of an errored period of operation and improves burst error immunity of the fault location system.

When the pseudorandom test sequences are not transmitted and regular data sequences are transmitted onto the transmission line 16, the two sequences of signals applied to the inputs of the comparator 66 are random. These signals, when processed by the comparator 66, the flip-flops 71 and 72 and the OR gate 73, produce a sequence of pulses in which half of the pulses are logic level one. In response thereto, the one-shot circuit 75 produces a seqeunce in which almost all pulses are logic level one. This clearly is a different output pulse pattern than the pulse pattern produced during the fault location testing.

These output pulse patterns from the one-shot circuit 75 are applied by way of a lead 76 directly to an input of an AND gate 77. The output pulse patterns also are processed through an integrator and comparator circuit 78. First of all the output pulse pattern is integrated and is applied to the input of the comparator portion, which has two thresholds with built-in hysteresis. The comparator produces the output for the circuit 78. This output is a high level signal when the integrated signal is less than a first, or low, threshold level. Alternatively the comparator produces a low level output signal when the integrated signal is greater than a second, or high, threshold level. As a result the integrator and comparator circuit 78 produces an integrated signal that is a one logic level when the input is low (from a fault location test sequence) and produces a zero logic level when the input is high (from a regular data sequence). Thus the AND gate 77 is open for passing error indication signals during a fault location test and is closed preventing passage of signals when the regular data sequences are being transmitted. Error indication signals which pass through the AND gate 77 travel along a fault location bus 79 to a counting and fault line telemetry circuit 80, which is described in detail in a patent application, Ser. No. 867,212 (Shedd Case 2), filed concurrently herewith in my name.

In FIG. 1, a fault location circuit 70 sends commands out on a fault location line 90 for controlling fault locations testing and response. For such a fault location test, the control circuit 15 produces on the lead 28 a signal which disables transmission of regular data sequences on the leads 14 and enables transmission of the test code sequences from the leads 18 out onto the leads 19. Then the fault location circuit 70, using a multitone signalling scheme, sends on the fault location line 90 a pair of tones selected to represent a clear command. This clear command is received in the counting and fault line telemetry circuit 80 of FIG. 4, where it clears an error indication counter.

Subsequently start and stop commands are sent through the fault location line 90 by the fault location circuit 70 of FIG. 1. They enable an error indication counter in the counting and fault line telemetry circuit 80 to count error indication pulses for a predetermined period of time. During that period, the multiplexer 12 and the converter 13 transmit the test code sequence out on the transmission line 16 and errors are determined. An indication of the number of errors is counted. When the stop command is received at the counting and fault line telemetry circuit 80 of FIG. 4, the error indication counter is stopped and the final count is stored therein until a response is requested.

Subsequently when the west terminal requests the error count from the circuit 80, a telemetry circuit associated with the error indication counter sends the stored indication of the magnitude of the error count to the west terminal of FIG. 1. In the west terminal, a processor receives the error count data and processes it together with the predetermined test time and the type of signal transmitted (e.g., without periodic violations) to determine an error rate at the regenerator.

By performing the fault location test one time and subsequently polling all repeater locations along the transmission line 16, the terminal 10 receives error indication readings for each of the regenerators 20 and 30 and others not shown. These error indication readings then are processed into error rates which will disclose which repeater section, if any, has failed or is operating marginally.

The foregoing discloses an illustrative embodiment of the invention. This embodiment together with others, which are made obvious in view thereof, are considered to be within the scope of the appended claims.

What is claimed is:

1. A digital signal regenerator arranged for fault locating, the regenerator comprising
   means for receiving a sequence of four-level signals representing first and second sequences of binary signals, the second sequence of binary signals being the same as the first sequence of binary signals but delayed by n time slots;
   means for decoding the four-level sequence of signals into the first sequence of binary signals and the second sequence of binary signals;
   means for delaying the first sequence of binary signals by n time slots into a delayed first sequence of binary signals; and
   means for comparing the delayed first sequence of binary signals with the second sequence of binary signals to produce an error signal only when concurrent bits of the delayed first sequence of binary signals and of the second sequence of binary signals are different from one another.

2. A digital signal regenerator, in accordance with claim 1, further comprising
   means responsive to the error signal for determining an indication of a number of errors occurring during a predetermined interval.

3. A digital signal regenerator arranged for fault locating, the regenerator comprising
   means for regenerating a sequence of four-level signals;
   means for decoding the sequence of four-level signals into first and second sequences of binary signals, the second sequence of binary signals being the same as the first sequence of binary signals but delayed;

means for delaying the first sequence of binary signals into a delayed first sequence of binary signals; and means for comparing the delayed first sequence of binary signals with the second sequence of binary signals to produce an error pulse when concurrent bits of the delayed first and the second sequences of binary signals are different from one another.

4. A digital signal regenerator, in accordance with claim 3, further comprising means, responsive to the error pulse, for stretching the duration of the error pulse.

5. A digital signal regenerator, in accordance with claim 4, further comprising means, responsive to the stretched error pulse, for integrating the stretched error pulse into an integrated signal; and means, responsive to the integrated signal, for transmitting the stretched error pulse when the integrated signal has an amplitude less than a first predetermined level and for disabling transmission of the stretched error pulse when the integrated signal has an amplitude greater than a second predetermined level.

6. A digital signal regenerator, in accordance with claim 3, further comprising means, responsive to the error pulse, for integrating the error pulse into an integrated signal; and means, responsive to the integrated signal, for transmitting the error pulse when the integrated signal has an amplitude less than a first predetermined level and for disabling transmission of the error pulse when the integrated signal has an amplitude greater than a second predetermined level.

* * * * *